May 17, 1938. C. H. SMITH 2,117,633
ROLLER THRUST BEARING
Filed Jan. 19, 1937

Inventor:
Charles H. Smith

Patented May 17, 1938

2,117,633

UNITED STATES PATENT OFFICE 2,117,633

ROLLER THRUST BEARING

Charles Henry Smith, Essex, England, assignor to Norma-Hoffmann Bearings Corporation, Stamford, Conn., a corporation of New York Application January 19, 1937, Serial No. 121,339
In Great Britain January 14, 1936

5 Claims. (Cl. 308—235)

This invention relates to roller thrust bearings of the type employing cylindrical rollers radially disposed between flat tracks and arranged in bored spaces in a solid annular cage.

In bearings of this type, hitherto the cage was provided with a number of radial bores within which are arranged, end to end, a number of rollers and a substantial wastage of space and loss of capacity was incurred as a result of the arrangement of the bores which extended unbroken from the inner to the outer circumference of the cage. The spacing of the bores was determined by the minimum permissible distance between each bore at the inner circumference and consequently the bores were widely spaced at the outer circumference.

In such cages also it was a difficult matter, when the bores were long, to drill them accurately.

In order to avoid these difficulties, according to this invention the cage comprises a number of individual concentric ring parts which are each formed with radial bores to receive the rollers, and are subsequently connected together.

The cages according to the invention are not to be confused with cages in which the pockets for the rollers were stamped or pressed out of a blank and it has already been proposed to arrange the pockets in such a cage in a number of concentric rings formed in a single integral blank.

A cage embodying the invention is illustrated by way of example in the accompanying drawing in which—

Figure 1:
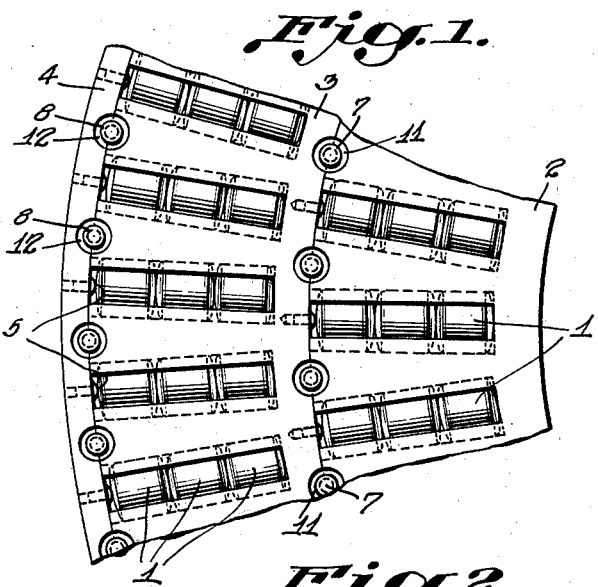
Figure 2:
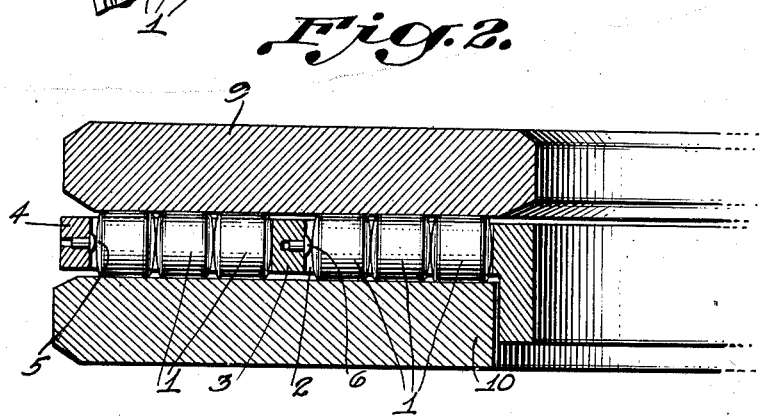
Figure 3:
Figure 3:
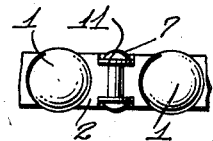

Fig. 1 is a fragmentary plan;
Fig. 2 a section of half the cage in position between the races; and
Fig. 3 shows the method of securing the ring parts together.

In the drawing, the rollers 1 are accommodated in pockets bored in an inner ring 2 and an outer ring 3. A cap ring 4 encircles the outer ring 3 and is drilled to receive the shanks of hard steel buttons 5. The buttons 5 bear on the outer rollers 1 in the ring 3 while similar buttons 6 accommodated in the inner surface of the ring 3 bear on the outer rollers in the ring 2. Rivets 7 and washers 11 (see Fig. 3) accommodated in holes drilled in both rings 2 and 3 at their outer and inner surfaces respectively key and secure the rings together. Rivets 8 and washers 12 similarly arranged secure the cap ring 4 to the ring 3. The rings are counterbored to receive the washer 12 as seen in Fig. 3.

Fig. 2 shows the rollers between the flat races 9, 10.

By dividing the cage according to the invention the necessary cage strength can be maintained while permitting the number of rollers in a cage of given dimensions to be increased as compared with the known cages of similar dimensions, by making the spacing between the rollers at the inner periphery of the outer ring substantially equal to the spacing at the inner periphery of the inner ring. Conversely, the dimensions of a cage according to the invention may be smaller than those of a known cage of equal capacity.

The cage according to the invention is also easier to manufacture due to the fact that the bores have smaller length than in the known cages.

A further advantage is conferred by the invention by reasons of the fact that the length of each bore is less than hitherto and the resultant stresses in the cage metal reduced.

The known cages were provided with cap rings to close the outer ends of the bores and in carrying out the invention a cap ring may be employed to encircle the outer cage part and each inner cage part capped by the next outer part. The outer cap is drilled to take a number of pins each carrying a hard steel button which bears on the end of the outer roller in a bore and each outer cage part is also provided with similar buttons which bear on the outer ends of the rollers in the adjacent inner cage part. The respective cage parts are keyed together by rivets which lie in holes formed at the junction of adjacent parts, the parts being counterbored to receive the heads of the rivets. The outer cap ring is similarly keyed to the outer cage part.

I claim:

1. A cage for roller thrust bearings comprising a plurality of individual concentric ring parts, the outer peripheral portion of one ring abutting the inner circumferential portion of the radially adjacent ring, each of said rings having bores radially disposed to accommodate rollers, and means for joining one ring to each adjacent ring.

2. A cage for roller thrust bearings comprising a plurality of individual ring concentric parts, the outer peripheral portion of each ring abutting the inner circumference of its radially adjacent ring, each of said rings having radially disposed bores to accommodate rollers, means for joining the rings adjacent to each other, said means including registering key-ways in the rings where they join each other, keys in said key-ways, and means for fastening said keys to the rings.

3. A cage for roller thrust bearings comprising an individual ring part having a plurality of radially disposed bores terminating with their open ends at the perimeter of said part, a second ring part provided with a plurality of bores, said second part being concentric to the first part, with the inner circumferential portion of the second part acting as a closure for the open ends of the bores of said first part, and means joining said parts together.

4. A cage for roller thrust bearings comprising an individual ring part having a plurality of radially disposed bores terminating with their open ends at the perimeter of said part, a second ring provided with a plurality of bores for receiving rollers, said second part being arranged concentrically with respect to the first part, the inner circumference of the second part acting as a closure for the bores of said first part, means joining said parts together, and hardened buttons on said first part abutting the rollers in said second part.

5. A cage for roller thrust bearings comprising radially disposed concentric ring parts, each having a plurality of bores for receiving rollers, and means for joining said ring parts together, the distance between the radial inward ends of said bores in both ring parts being substantially equal.

CHARLES HENRY SMITH.